Figure 1:
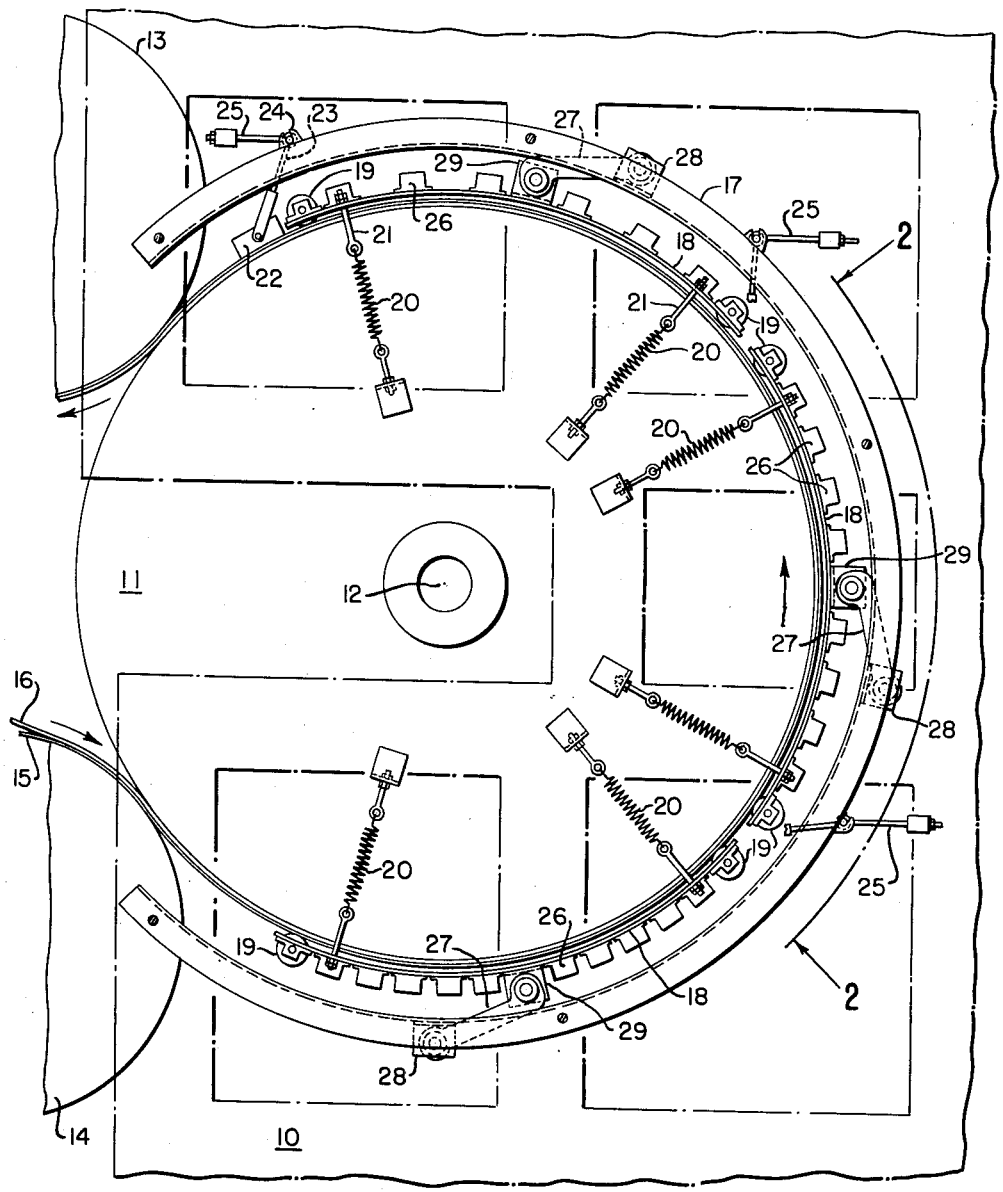

United States Patent Office 3,032,811
Patented May 8, 1962

3,032,811
BAND HEATER AND PROCESS
Thomas M. Knowland, Belmont, and Frederick J. Brauneis, Malden, Mass., assignors to American Biltrite Rubber Co. Inc., Chelsea, Mass., a corporation of Delaware
Filed Mar. 31, 1960, Ser. No. 18,927
7 Claims. (Cl. 18—6)

This invention relates to machines employing in their construction a rotary heated drum and a cooperating pressure band for curing or vulcanizing sheet material. The invention comprises more particularly a new and improved heater for the pressure band of such machines and a novel combination of self-adjusting heater with the other elements of the machine.

In operating machines of this class the product to be cured is passed between the heated drum surface and a steel pressure band maintained under high tension so that it exerts a severe molding pressure on the product during the curing period. The drum is mounted for rotation about a fixed axis so that its surface always moves in a fixed pre-determined path.

The pressure band, on the contrary, must follow a path determined by the thickness of the interposed material traveling between it and the cylindrical surface of the drum. In other words, the band will travel in a path further from the axis of the drum, at a longer radius of curvature, in engaging a thick product than in engaging a thin product.

It is important for the heat to be transferred to a sheet product from both sides in order to keep the time of cure to a minimum and to insure a uniform cure throughout the product. The heating of the drum presents no problem as it can be formed as a hollow pressure vessel into which steam can be admitted at any desired pressure and temperature. Heating of the band presents serious problems on account of the different paths it must travel in dealing with products of different thicknesses. It has not proved practical to heat the band by conduction since when the band is engaged with platens or the like frictional contact of metal to metal made over a large area results in power loss and the heat transfer varies with changing contact conditions. The present invention provides means for heating the pressure band through radiation from electrically heated units so constructed and arranged that the radiating distance from the heater to the steel band is kept constant at all times. This is important since the heat received by any given area of the steel band is proportional to the square of the distance from the radiating surface to the band. In one aspect, therefore, the invention comprises an arcuate or segmental heater so constructed and arranged that it is held at all times at a pre-determined uniform distance from the band in all different positions of the band with respect to the drum. As herein shown, the heater comprises a segmental metal plate conforming in general to the cylindrical surface of the heated drum. It is supported by rolls which run in contact with the encircling pressure band and equipped with means for yieldingly holding the rolls in contact with the band while permitting the radius of curvature of the band to vary in accordance with its distance from the axis of the drum. The heater is thus made self-adjusting and will accommodate itself to sheet products of considerable difference in thickness.

Each of the segmental heater plates is provided with a series of electrical heating units distributed upon its convex surface and these heaters are located about the heating arc of the drum. If desired, automatic temperature control devices may be arranged to engage the pressure band at points between the individual heaters in order to detect the working temperature of the band and to regulate the intensity of the heating units accordingly.

These and other features of the invention will be best understood and appreciated from the following description of a preferred embodiment thereof selected for purposes of illustration and shown in the accompanying drawings in which—

Figure 2:
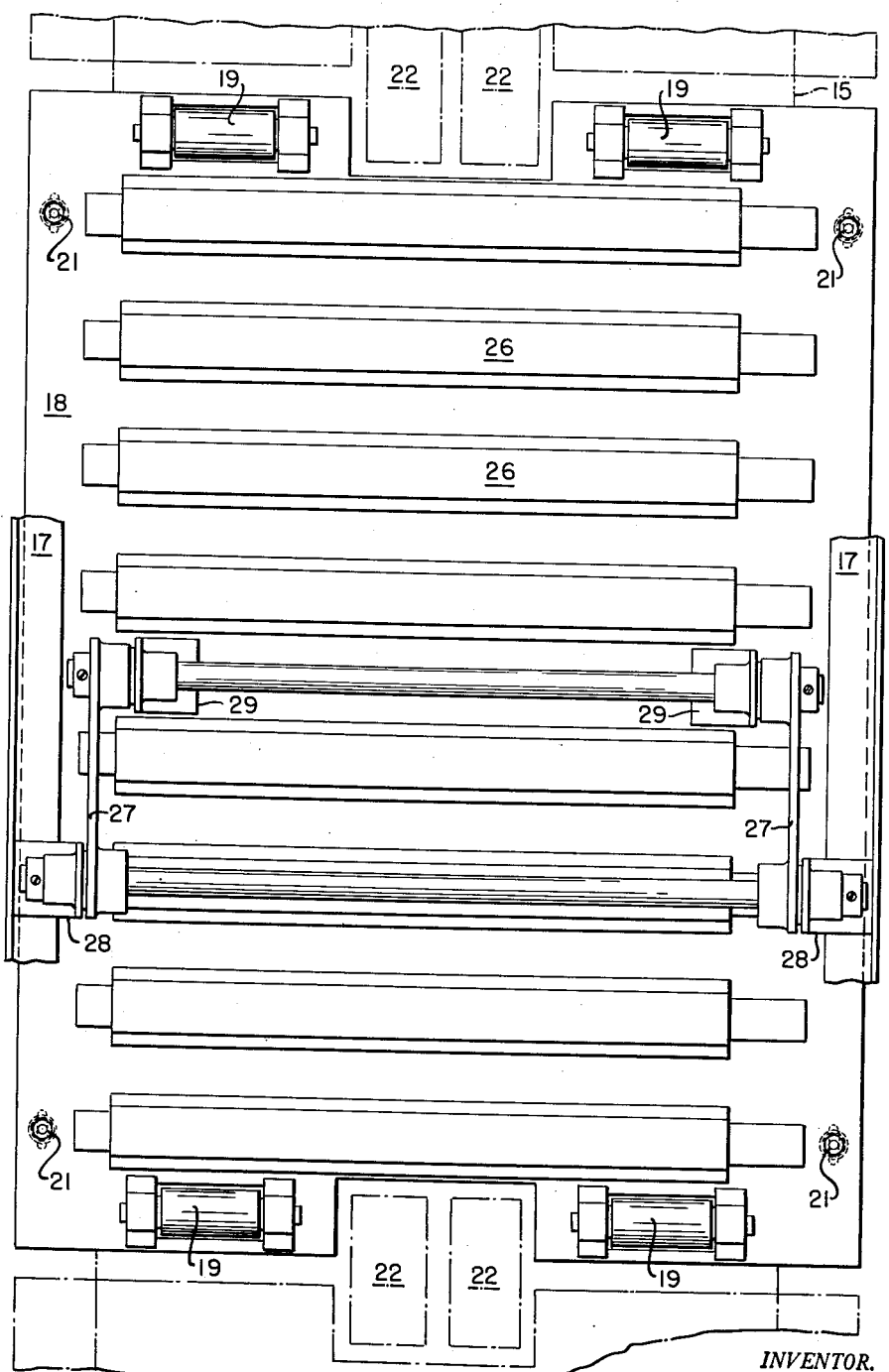
Figure 3:
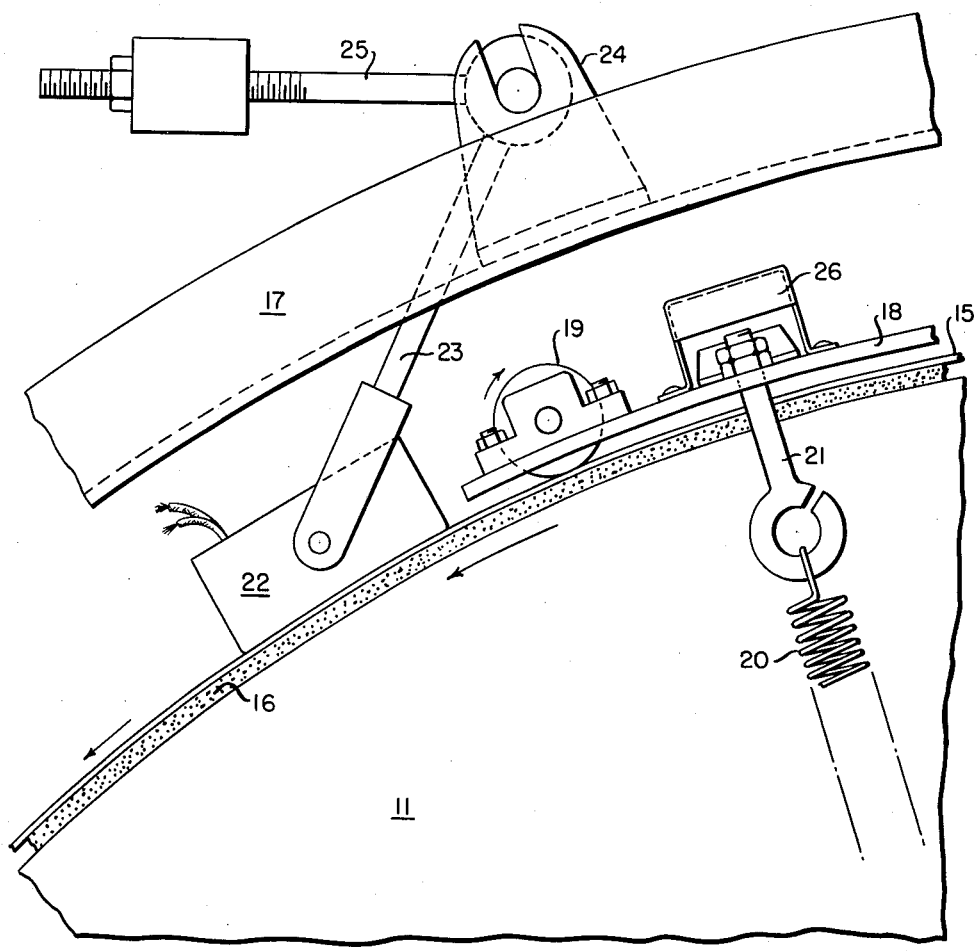

FIG. 1 is a view in side elevation of the machine showing one side of the frame removed.
FIG. 2 is a fragmentary view in rear elevation, and
FIG. 3 is a fragmentary view on an enlarged scale.

The invention is herein shown as embodied in a curing or vulcanizing machine of the well known "Rotocure" type more fully described, for example, in U.S. Letters Patent No. 2,039,271, Bierer, to which reference may be had for further detail of construction. As disclosed in that patent the machine includes a pair of massive side frames one of which marked 10 is partially shown in FIG. 1. Between these side frames is journaled a steam heated drum 11 rotatable upon a horizontal shaft 12. A steel pressure band 15 encircles the greater arcuate portion of the circumference of the drum, being guided to the drum by a pressure roll 14 and from the drum by an overhead driven roll 13. From the rolls 13 and 14 the pressure band passes rearwardly to a tension roll (not shown) which maintains the band 15 under severe tension. The raw stock 16 to be cured or vulcanized is fed to the drum 11 at the bite of the pressure band and drum opposite the guide roll 14 and is removed in cured condition from the band after leaving the driven roll 13.

The heater of the present invention is mounted between two rings 17 angular in cross section and bolted to the side frames at either end of the drum. The heater is shown in FIG. 1 as divided into three sections each comprising a segmental carrier plate 18 which may be of aluminum and conforms in curvature to the curvature of the band 15 when operating upon stock of average thickness. For example, in operating a machine having a drum radius of 30.000" the thickness of the stock may vary from .032" to 1.250" or an average thickness of 0.641". The thickness of the pressure band may be 0.080" and under these circumstances the inside radius of the segmental plates 18 will be 30.721".

Each of the carrier plates 18 is provided with brackets at each end in which are journaled rolls 19 arranged to run on the outer surface of the pressure band 15 and to support the plate 18 at a fixed predetermined distance from the band. As shown in FIG. 2, the rolls 19 are arranged in pairs spaced apart endwise with respect to each other and serving to support the plate 18 across its entire width. Adjacent to each pair of rolls 19 and near the ends of the segmental carrier plates 18 are provided radial tension springs 20 each secured to an eyebolt 21 at its outer end and at its inner end to a bracket fast to the machine frame 11 beyond the ends of the drum. The springs 20 serve to maintain the rolls 19 always in yielding contact with the outer surface of the pressure band 15. The rolls therefore furnish rotary support for the heater sections and revolve as the pressure band travels beneath them with the drum and interposed stock.

Secured to the outer surface of each carrier plate 18 is a series of heaters 26. These are spaced uniformly upon the carrier plates and energized by electrical connections not shown. Each space heater is protected by a shield which allows the proper insulation while permitting free expansion of the carrier plate. They are effective to maintain by radiation the carrier plates 18 uniformly at the desired degree of curing or vulcanizing temperature.

As herein shown, the working temperature of the pressure band may be recorded and controlled through the medium of thermocouple units 22 arranged at suitable intervals in contact with the band as shown in FIGS. 1 and 3. One of these units is mounted upon the end of an arm 23 projecting from a shaft journaled in brackets 24 on the fixed rings 17 and connected to an outwardly disposed arm 25 carrying an adjustable counterweight by which the pressure of unit 22 upon the band may be regulated and maintained.

Each heater section is herein shown as provided upon its outer face and mid-way between its ends with a pair of brackets 29 and movably suspended from the fixed rings 17 by links 27 pivotally connected to a transverse shaft journaled in bearings 28 on the rings 17.

While the segmental heater plates 18 have been described as initially conformed to the radius of curvature of the band operating upon stock of average thickness, it is contemplated that these plates may be made sufficiently flexible actually to conform to the changes in radius curvature of the band so that the heaters will operate with an almost absolute degree of accuracy throughout the whole working range of the machine.

It will thus be seen that the present invention includes within its scope a novel process of heating the product by means of radiator plates which are so designed as to remain equi-distant at all times from the steel pressure band which molds the product while at the same time means are provided for electrically heating the radiators continuously to the desired temperature. Moreover the advantages of radiant heating are obtained without the heavy heat losses incurred in using units that must be spaced away from the pressure band where the temperature of the heating element must be high, its life short and the heat loss high due to convection and other losses.

On the contrary, the present invention provides closely spaced radiator plates that may be operated at moderate temperatures without substantial heat losses due to convection with high efficiency and little necessity for replacement.

Also the roller mounting for the heater plates results in the elimination of practically all frictional loss from the system.

Having thus disclosed our invention and described in detail an illustrative embodiment thereof, we claim as new and desire to secure by Letters Patent:

1. A machine for curing elastomeric material, comprising a heated drum and a partially encircling flexible pressure band movable with the drum and also toward and from the circumference of the drum in accordance with variations in the thickness of the interposed stock, together with a segmental radiant heater, and springs cooperating with rolls on the heater for holding the heater at all times at a predetermined uniform distance away from the band in all different positions of the band with respect to the drum.

2. A machine for curing elastomeric material, comprising a rotary heated drum and a partially encircling pressure band movable circumferentially with the drum and also in and out with respect to the drum in accordance with variations in the thickness of the interposed stock, in combination with a segmental radiant heater supported by rolls running on the outer surface of the band and so maintained always at a predetermined distance away from the band, and springs attached to the heater for imparting to the heater continuous pressure toward the axis of the drum.

3. A machine for curing elastomeric material as described in claim 2, further characterized in that the said segmental heater is longitudinally flexible whereby its radius of curvature is increased simultaneously with outward movement of the pressure band from the circumference of the heated drum.

4. A machine for curing elastomeric material, comprising a heated rotary drum and a partially encircling pressure band, in combination with a series of segmental radiant heaters mounted on rolls engaging the band and spaced from each other about the circumference of the drum, springs attached to the heaters and cooperating with the rolls to maintain the heaters at a predetermined distance from the band, and automatic temperature controlling devices for the heaters engaging the band between adjacent heaters.

5. In a machine for curing elastomeric stock, having a heated rotary drum and a partially encircling pressure band, a self-adjusting radiant heater comprising a segmental carrier having a series of heating units distributed upon the convex surface thereof, band-engaging rolls supporting the carrier always at a predetermined distance from the band, and springs attached to the carrier and acting to hold the rolls always in contact with the pressure band as it passes about the drum in compressing the material to be cured.

6. A machine for curing elastomeric stock, having a frame, a heated rotary drum mounted therein, spaced rings secured to the frame at both ends of the drum, a metal pressure band partially encircling the drum, and segmental radiant heaters suspended by links from said rings and provided with rolls running upon the pressure band and maintained thereby always at a predetermined distance from said band.

7. In a machine for curing elastomeric stock, having a heated rotary drum and a cooperating pressure band movable with the drum, a segmental radiant heater carrying rolls that space it always from the outer surface of the band and run thereon as the band travels beneath them, and spring subjecting the rolls to continuous inwardly directed pressure.

References Cited in the file of this patent
UNITED STATES PATENTS

| | | |
|---|---|---|
| 1,724,645 | De Long | Aug. 13, 1929 |
| 2,181,859 | Baker et al. | Dec. 5, 1939 |
| 2,355,391 | Nelson et al. | Aug. 8, 1944 |
| 2,529,830 | Bierer | Nov. 14, 1950 |